(12) United States Patent
Flegel

(10) Patent No.: US 7,735,801 B1
(45) Date of Patent: Jun. 15, 2010

(54) VIBRATION ABSORBING MOUNT FOR ATTACHING AN ACCESSORY TO A PORTABLE POWER SOURCE

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 219 days.

(21) Appl. No.: 12/046,085

(22) Filed: Mar. 11, 2008

(51) Int. Cl.
*H02J 7/00* (2006.01)
(52) U.S. Cl. .................. 248/609; 174/545; 290/1 R
(58) Field of Classification Search ............ 290/1 R; 248/609; 174/545
See application file for complete search history.

(56) References Cited

U.S. PATENT DOCUMENTS

| | | | | | |
|---|---|---|---|---|---|
| 1,934,576 | A | * | 11/1933 | Watts | 362/192 |
| 2,701,866 | A | * | 2/1955 | Chapman | 439/366 |
| 4,339,060 | A | * | 7/1982 | Braida, Jr. | 224/428 |
| 5,067,065 | A | * | 11/1991 | Dahlgren | 362/369 |
| 5,929,611 | A | * | 7/1999 | Scott et al. | 322/46 |
| 6,543,926 | B2 | * | 4/2003 | Sherez | 366/108 |
| 7,011,068 | B2 | * | 3/2006 | Yamagata et al. | 123/195 A |
| D533,770 | S | * | 12/2006 | Schnackenberg | D8/354 |
| 7,161,253 | B2 | * | 1/2007 | Sodemann et al. | 290/1 A |
| 7,235,741 | B2 | * | 6/2007 | Schnackenberg | 174/72 A |
| 2006/0081086 | A1 | * | 4/2006 | Crist | 74/574.1 |
| 2006/0081392 | A1 | * | 4/2006 | Schnackenberg | 174/72 A |
| 2006/0119104 | A1 | * | 6/2006 | Wall | 290/2 |

OTHER PUBLICATIONS

PowerStay, Installation Instructions for Parallel Power Kit model 30501 and 73131, 1 page, internet dated Aug. 22, 2003.
PowerStay, Mounting Instructions for Parallel Power Kit model 30501A and 73131A, 2 pages, internet dated Jun. 2004.
Printout from website for Tele-Lite, showing a bracket for mounting a light directly to a generator, showing a bracket as used in an embodiment of the present invention. This bracket was on sale at least as early as Oct. 14, 2004.

* cited by examiner

*Primary Examiner*—Joseph Waks
(74) *Attorney, Agent, or Firm*—Boyle Fredrickson S.C.

(57) ABSTRACT

A generator has an accessory mounting member adapted to mount an electrical accessory that provides isolation of the electrical accessory from the generator such that transfer of vibratory forces generated during operation of the generator is mitigated. The accessory mounting member allows an electrical accessory, such as a parallel connection kit, transfer switch, or work light, to be securely mounted to the generator, yet isolated from the vibrations that occur during operation of the generator.

21 Claims, 17 Drawing Sheets

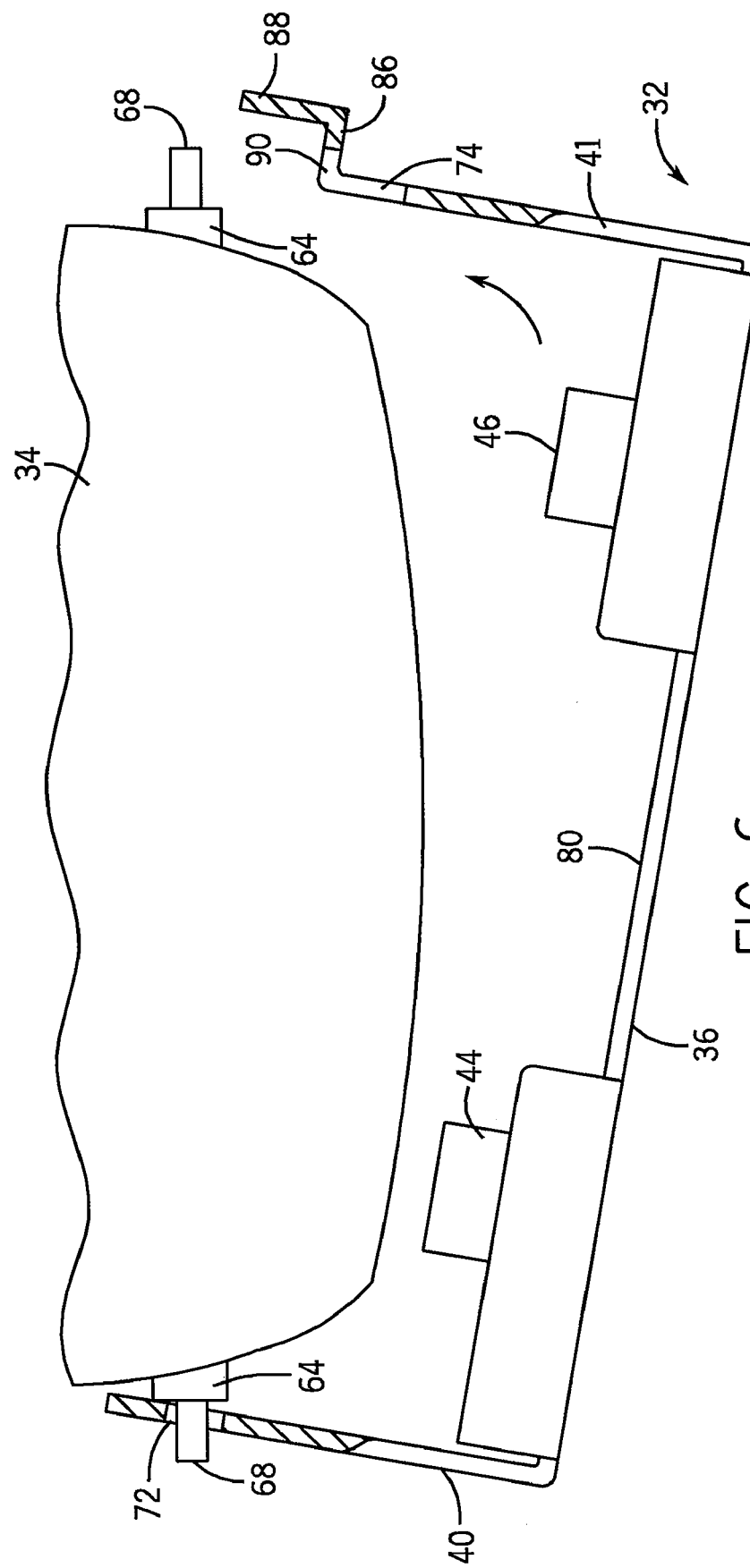

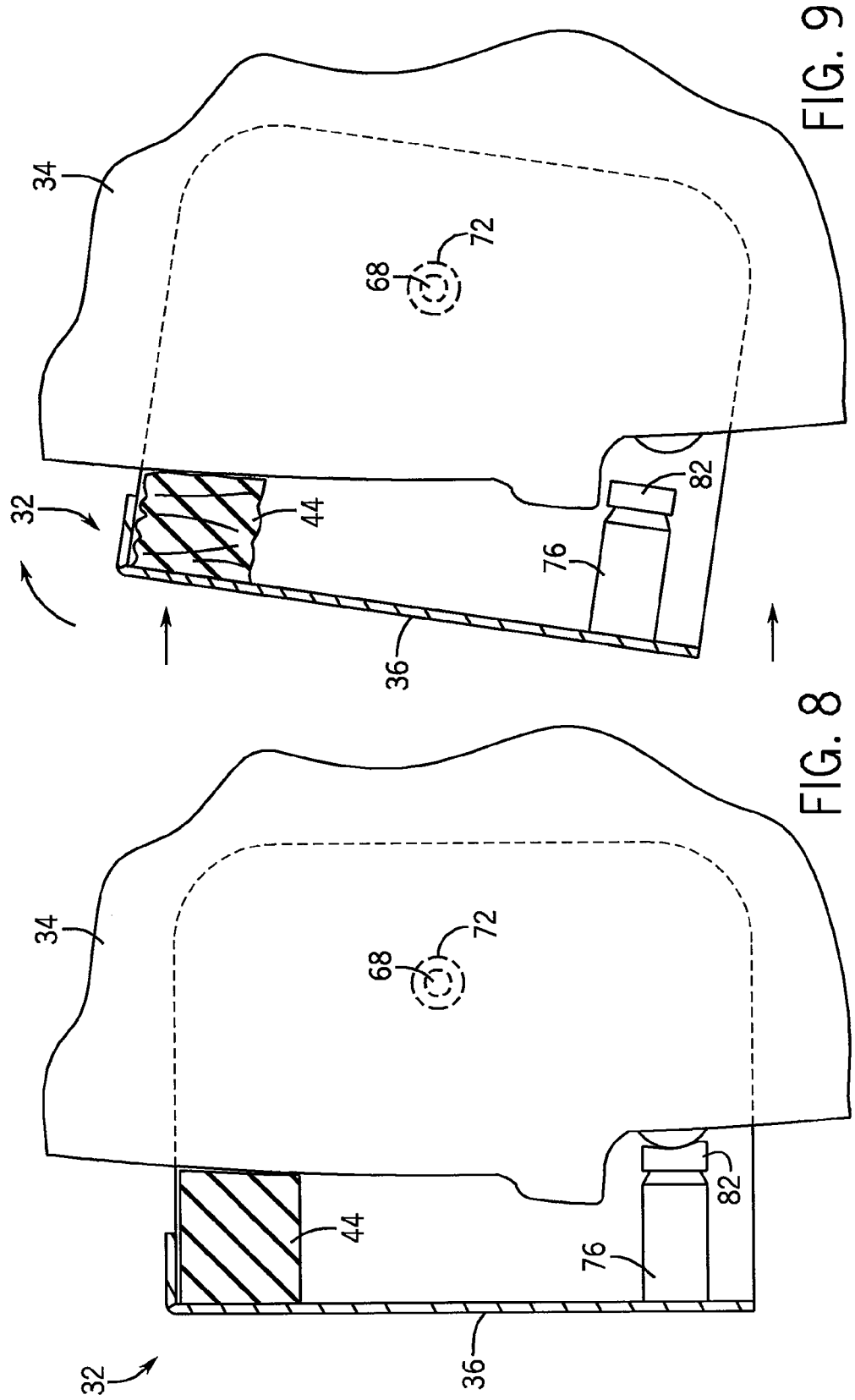

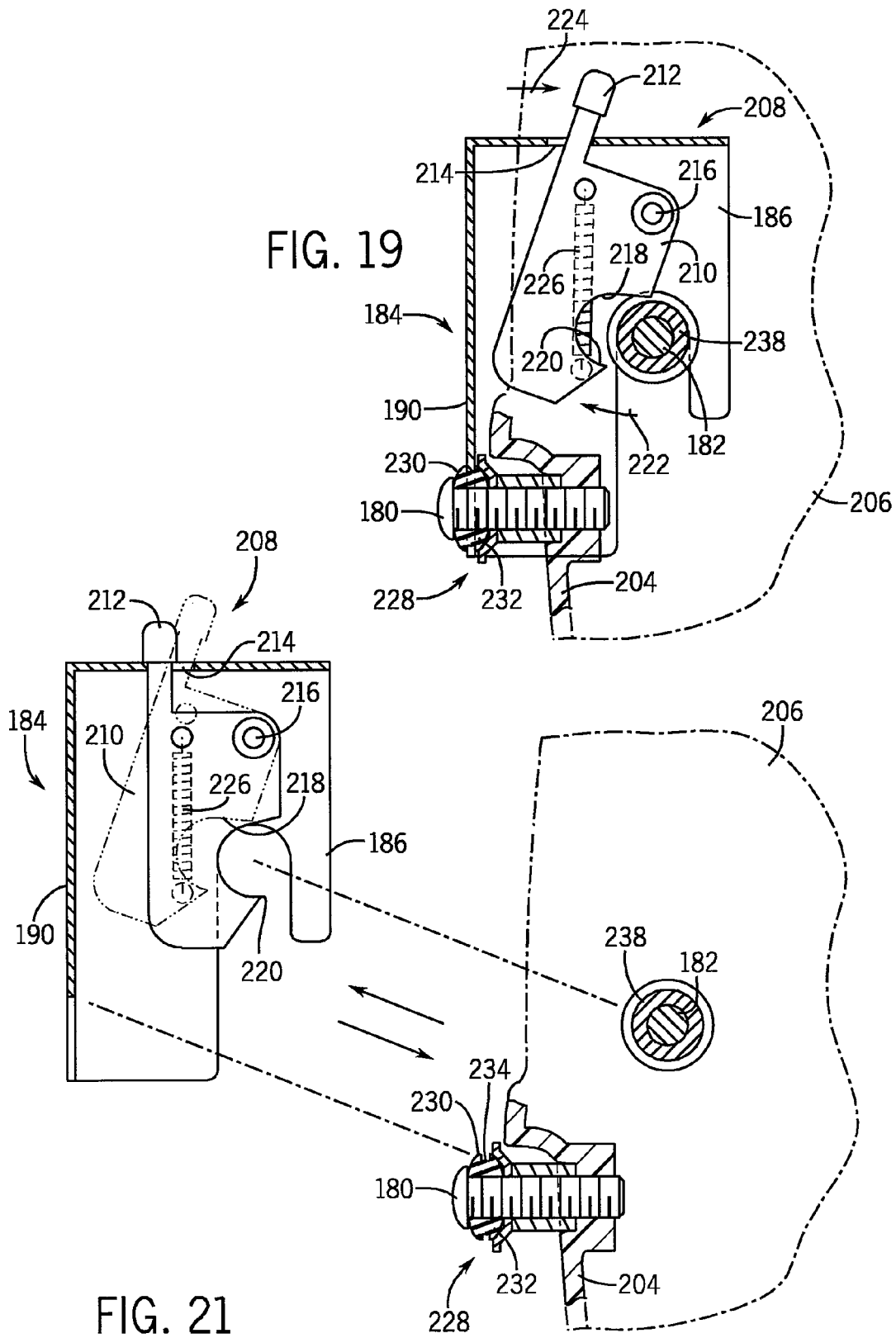

VIBRATION ABSORBING MOUNT FOR ATTACHING AN ACCESSORY TO A PORTABLE POWER SOURCE

BACKGROUND OF THE INVENTION

This invention relates generally to power generation devices and, more particularly, to an electric generator that incorporates vibration absorbing components so that vibrations generated during operation of the electric generator are not transferred to an electrical accessory mounted to the electric generator.

Power generators may be characterized as either fixed or portable. Fixed power generators are commonly used as back-up or emergency power supplies for dwellings and buildings during main or utility power failure. These power generators are typically large and heavy, and, as such, do not lend themselves to convenient portability. Portable power generators, on the other hand, are much smaller and lighter. These power generators are typically used during light industrial applications or consumer recreational uses, such as camping. Portable power generators are also used to power selected circuits of a dwelling or other building during a utility power outage.

Because of their smaller size and weight, portable generators are used in a variety of applications. In some situations, a single portable generator may be unable to provide the power demanded of a particular load. Therefore, parallel connection kits have been designed that allow two generators to be connected in parallel to provide a single power output with sufficient current for the load while maintaining the output voltage of the paired generators the same as for a single generator. U.S. Pub. No. 2006/0081392 discloses a parallel connection kit that is mounted on an attachment frame that is rigidly affixed to a generator. In certain circumstances, it may be desirable to mount other devices or accessories, such as a transfer switch or a work light, to a portable generator.

Existing accessories such as work lights, parallel connection kits, transfer switches, etc. do not adequately account for the vibration caused by operation of the electric generator, which is transferred to the attached electrical accessory. For instance, when attaching a work light to an electric generator, the vibration caused by the running engine of the generator will be transferred through the electric generator, the work light mount, and ultimately to the work light. As a result, the light output by the work light may vibrate undesirably.

SUMMARY OF THE INVENTION

The present invention is directed to a portable generator having an accessory mount that allows an electrical accessory to be interconnected with a generator in a manner that isolates the accessory from vibrations of the generator, so that performance-affecting vibrations transferred to the electrical accessory during operation of the generator are reduced, if not eliminated. In one representative embodiment, the accessory mount includes a mounting member that incorporates a vibration-absorbing cushion arrangement positioned between the generator and the mounting member. The mounting member may be configured to interconnect the accessory adjacent the face of the electric generator, and the vibration-absorbing cushion arrangement is disposed between the mounting member and the face of the electric generator. Thus, during operation of the electric generator, vibratory forces created by the running electric generator are absorbed, at least in part, by the cushion arrangement rather than transferred to the mounting member and the accessory. The cushion arrangement may take many forms. For instance, the cushion arrangement may be in the form of cushioning tabs affixed to and spaced from a backside defined by the mounting member. In another example, the interconnection points of the mounting member with the electric generator may include elements that absorb the vibratory forces created by the generator.

The vibration-reducing accessory mount of the present invention may be used in an embodiment in which the electrical accessory is permanently fixed to the mounting member, as well as an embodiment in which the electrical accessory is removably secured to the mounting member. In this regard, the vibration-reducing features may be incorporated into an accessory mounting arrangement that allows an accessory to be quickly and easily mounted to or removed from the generator. In one representative embodiment, the accessory mounting arrangement may be constructed such that tools are not required to mount the electrical accessory to the electric generator. The mounting member, including the vibration-absorbing cushion arrangement, is secured to the generator and the accessory, such as a parallel connection kit or a work light, is configured to be engaged with and removed from the mounting member in a tool-less manner. This construction provides an accessory mounting arrangement in which an accessory may be quickly and easily installed on or removed from a generator, and which also functions to reduce the transfer of vibrations from the running generator to the accessory.

Various other features and advantages of the present invention will be made apparent from the following detailed description and the drawings.

BRIEF DESCRIPTION OF THE DRAWINGS

The drawings illustrate the best mode presently contemplated of carrying out the invention.

In the drawings:

FIG. 6 is a top view of the receiver of FIG. 3 partially connected to the electric generator;

FIG. 8 is a section view of the receiver connected to the electric generator taken along line 8-8 of FIG. 7;

FIG. 9 is a section view similar to that of FIG. 8 showing the receiver tilted relative to the electric generator;

FIG. 19 is a section view of the electric generator and accessory receiver similar to the view of FIG. 18 showing the latch in an open position;

FIG. 21 is a section view of the electric generator and accessory receiver similar to FIGS. 18 and 19, illustrating how the accessory receiver is mounted to the electric generator of FIG. 16.

DETAILED DESCRIPTION OF THE PREFERRED EMBODIMENT

The present invention will be described with respect to a portable, gas-powered generator to which electrical accessories may be mounted by a user, when desired, and then removed when not being used. While three exemplary accessories will be shown and described, it is recognized that these accessories are merely representative and that other accessories different from those shown may also be used. Moreover, it is recognized that the generator and accessories may be packaged and sold together as a bundle or kit, or that the generator and accessories may be commercially available separately. Additionally, while the invention is particularly suitable for hand-held, portable generators, it is understood that the particulars of the invention may also be applicable with non-portable generators. Similarly, the invention is not limited to gas-powered generators.

Also, while the present invention will be described with respect to vibration-reducing elements designed to reduce the transfer of vibratory forces from the electric generator to an electrical accessory temporarily mounted to the generator, it is understood that such vibration-reducing elements may also be used to reduce the transfer of vibratory forces from an electric generator to electrical accessories permanently mounted to the electric generator. Moreover, while the invention will be described with respect to a receiver adapted to interchangeably mount multiple accessories to the generator, it is understood that the vibration-reducing features described herein may be incorporated in receivers that are permanently connected to the electrical accessory to be mounted to the generator.

Figure 1:
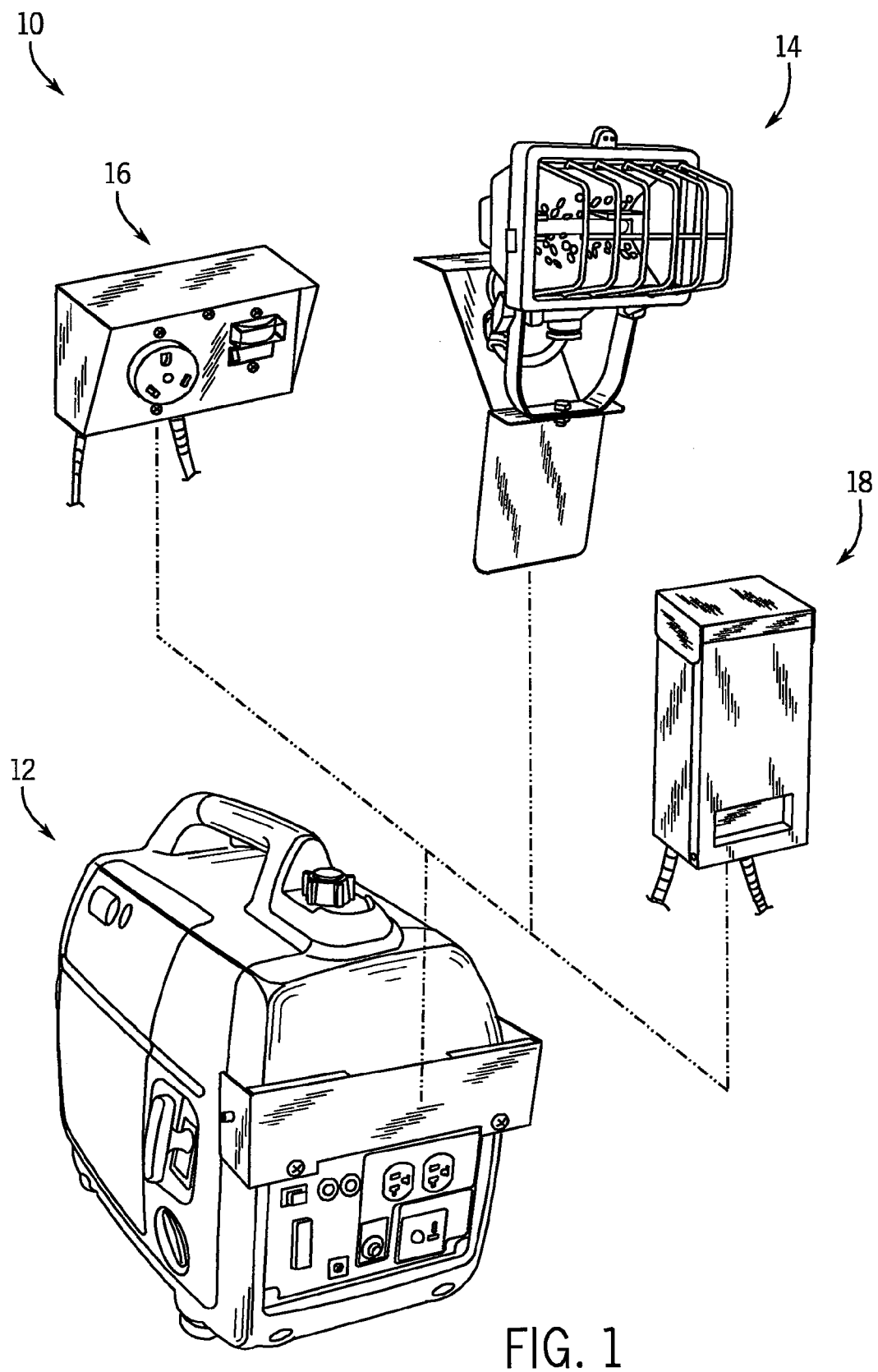
FIG. 1 is an isometric view of an electric generator and accessories kit according to one aspect of the present invention.

FIG. 1 shows a representative accessories kit 10 that in the illustrated embodiment is adapted for use with a portable generator 12. the accessories kit 10 is adapted to removably mount an electrical accessory, such as a work light 14, a parallel connection device 16, or a transfer switch 18, to generator 12. The portable generator 12 is operative as a stand-alone device or with any of the accessories. As will be explained, in a representative embodiment, when an accessory is to be used in conjunction with the generator 12, the accessory may be mounted to the generator 12 using a receiver adapted to interchangeably receive multiple types of accessories. However, it is understood that each accessory may be permanently connected to or otherwise integrated with a receiver used to mount that accessory to the generator. As will also be explained, the accessory may be mounted in a manner that does not require any fasteners to secure the accessory to the generator 12. Thus, a user may quickly attach or detach an accessory to or from the generator 12.

Figure 2:
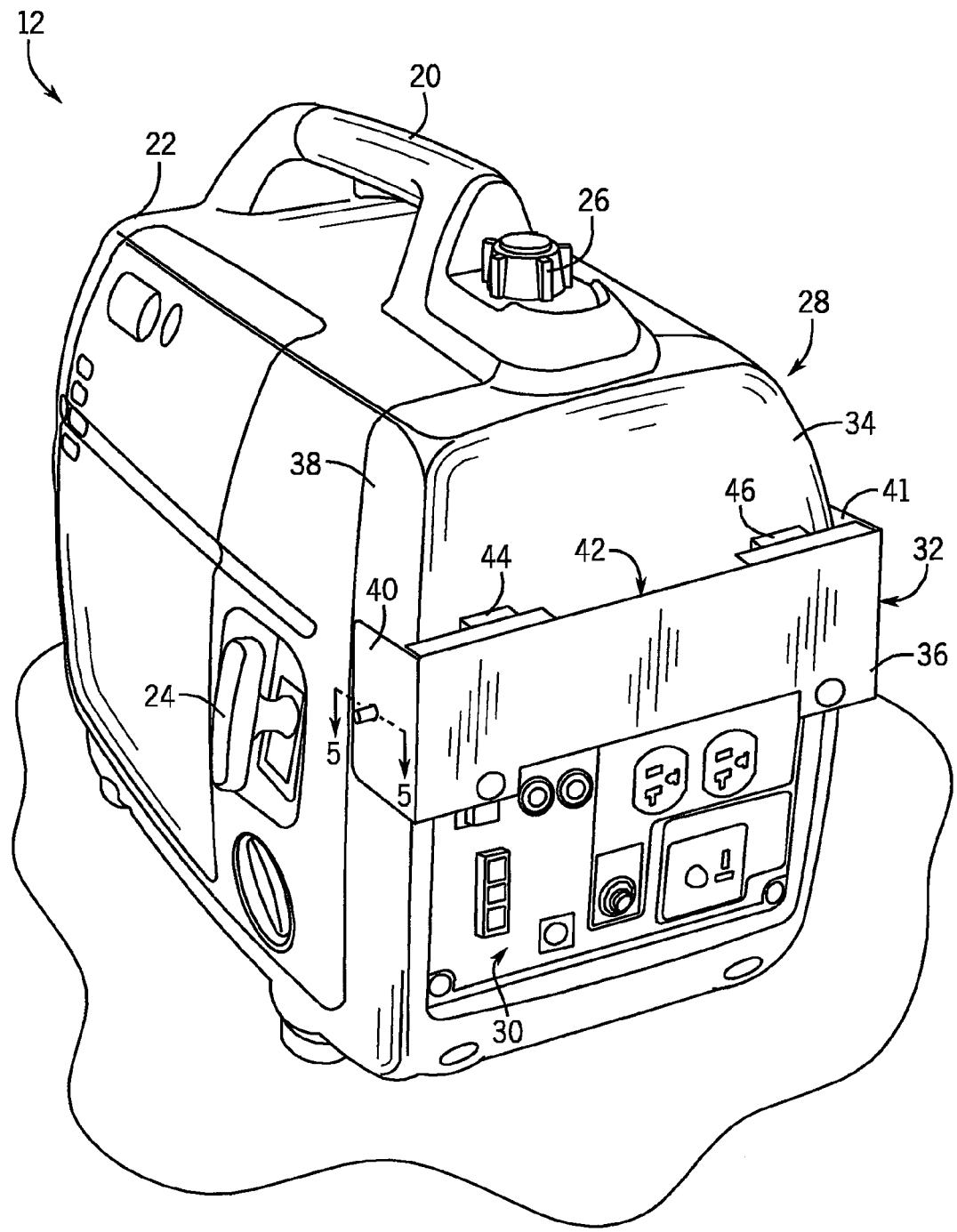
FIG. 2 is an isometric view of the electric generator shown in FIG. 1.

With additional reference to FIG. 2, generator 12 includes a handle 20 to facilitate hand-held portability. The generator 12 includes a housing 22 to which the handle 20 is coupled or otherwise integrally formed. The housing 22 provides an enclosure for the electrical and mechanical components used to provide an electrical output. In the illustrated embodiment, the generator 12 includes an engine (not shown) that may be started in a conventional manner using a pull start 24. As is customary for engine-driven generators, generator 12 has a fuel reservoir (not shown) that may be replenished when a fuel cap 26 is removed. The front of the housing 22 has a faceplate 28 that supports an interface panel 30 including various connectors, terminals, indicators, and switches, as is customary in the art.

Figure 3:
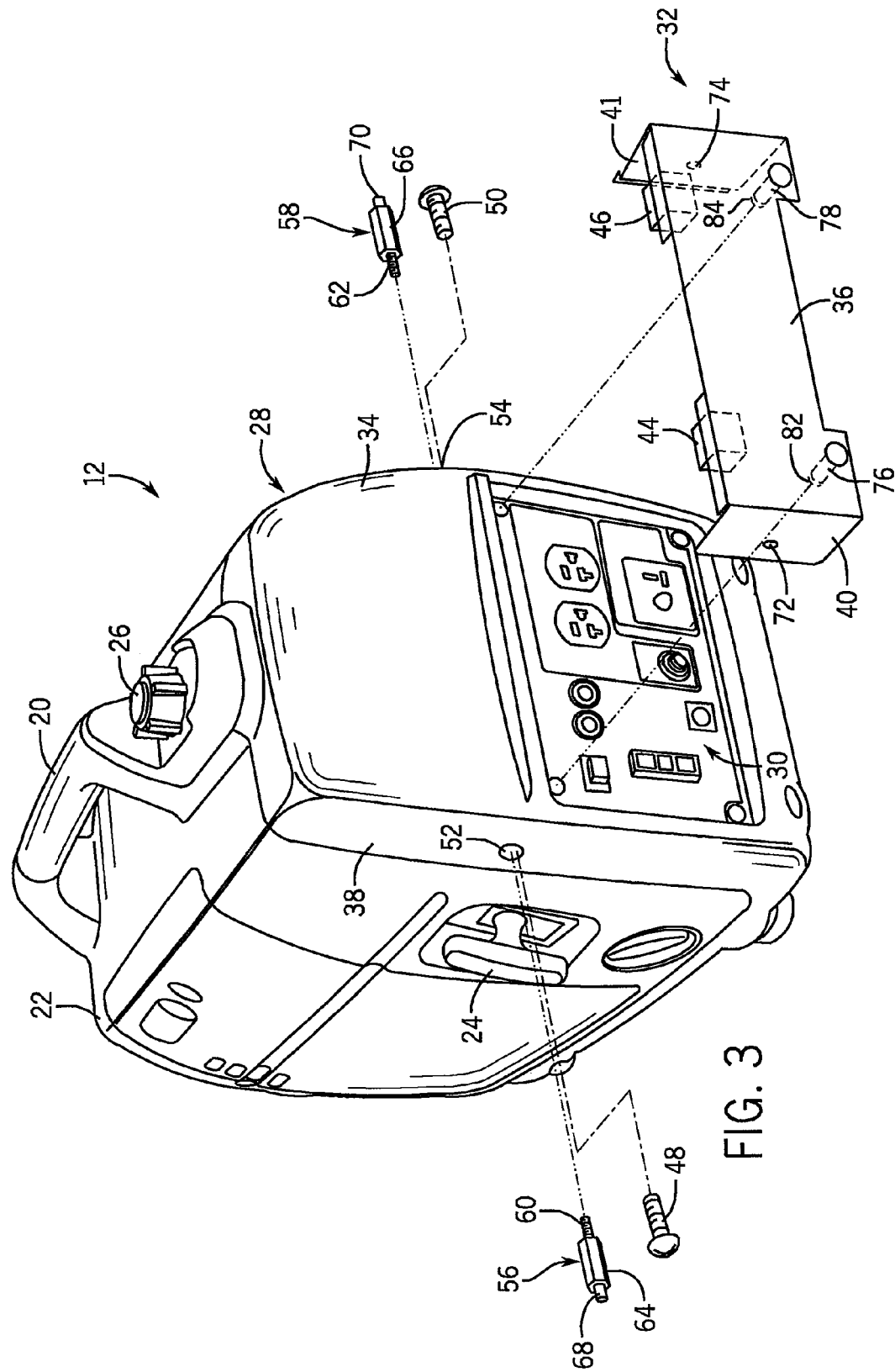
FIG. 3 is a partial exploded view of the electric generator of FIG. 1 and a receiver incorporated in the accessories kit adapted to receive an electrical accessory.

A mounting member or receiver 32 may be mounted across the front 34 of the faceplate 28. The receiver 32 includes a connector plate 36 that traverses the front 34 of the faceplate 28 and is fixedly attached to sidewalls 38 (one of which is shown in FIGS. 2 and 3) of the faceplate 28. The receiver 32 is attached to the sidewalls 38 through a pair of mounting arms 40 of sufficient length such that the connector plate 36 is laterally offset from the front 34 of the faceplate 28. The lateral offset creates a gap 42 between the backside of the connector plate 36 and the front 34 of the faceplate 28. This gap 42 may be used to receive a mounting clip of an accessory when the accessory is mounted to the generator 12. Interconnected between the faceplate 28 and the backside of the connector plate 36 are a pair of cushions 44, 46, each of which is comprised of material that absorbs or otherwise dampens vibrations caused by operation of the electric generator. Thus, the transference of vibratory forces from the generator to an attached accessory generated during operation of the generator is reduced.

Alternately, it is contemplated that the receiver 32 and the cushions 44, 46 may be integrally formed as a single member using one of a number of known manufacturing techniques rather than interconnected using epoxy or other adhesive material. In yet a further embodiment, it is contemplated that the receiver 32 itself, or at least a portion thereof, may be formed from vibration-reducing material.

Figure 4:
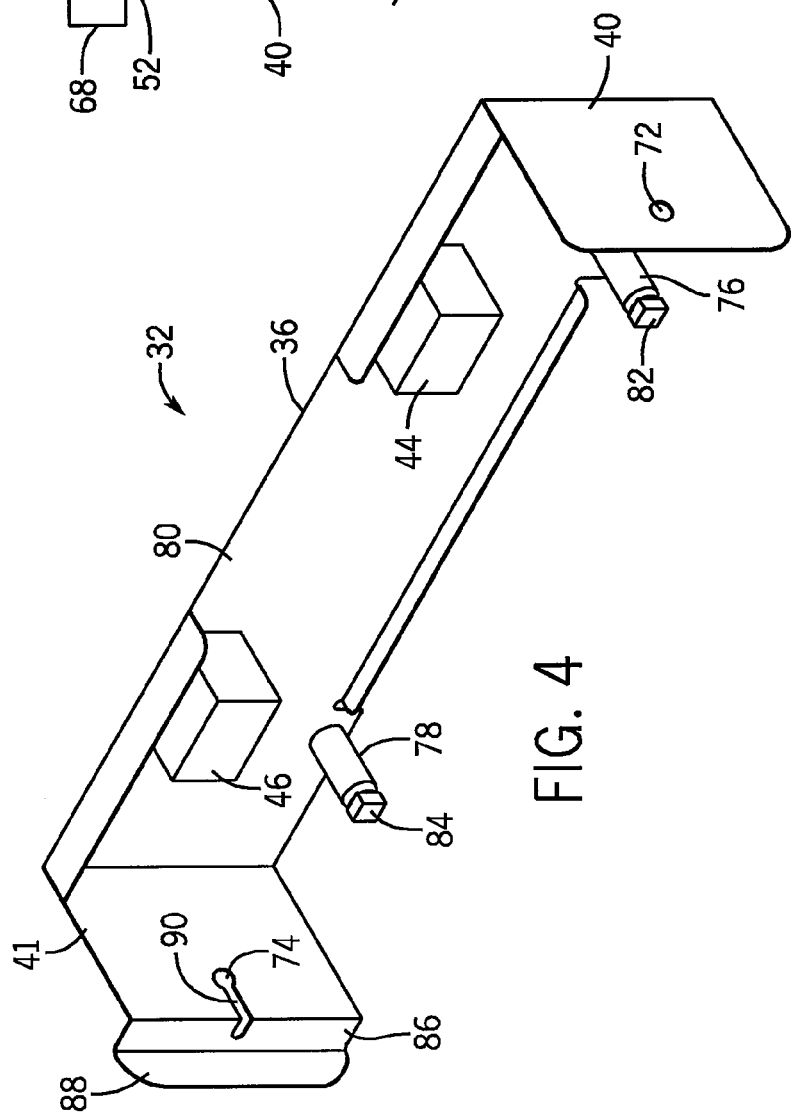
FIG. 4 is a rear isometric view of the receiver shown in FIG. 3.

Referring now to FIG. 3, in one representative embodiment, the generator 12 may be used without receiver 32. As such, a pair of screws 48, 50 may be inserted into holes 52, 54, respectively, defined in sidewalls 38. The screws 48, 50 secure the faceplate 28 to the housing 22 of the generator 12. On the other hand, to use the receiver 32, screws 48, 50 are removed, and studs or pins 56, 58 are threaded into holes 52, 54, respectively. As further illustrated in FIG. 5, each pin 56, 58 has a threaded tip 60, 62, a body 64, 66, and a stub 68, 70. Each stub 68, 70 is adapted to extend through one of a pair of openings 72, 74 formed in arms 40, 41, respectively, of the receiver 32. In addition to cushions 44, 46, the receiver 32 also includes a pair of stops 76, 78 connected to the backside 80 of the connector plate 36, as shown in FIG. 4. The stops 76, 78 are designed to abut against the faceplate 28 of the generator 12. In one embodiment, the stops 76, 78 are comprised of vibration-absorbing or vibration-dampening material. In another embodiment, the stops 76, 78 each have a tab 82, 84 of vibration-absorbing or vibration-dampening material.

As also illustrated in FIG. 4, arm 41 has a slightly different construction than arm 40. More particularly, arm 41 includes a flange 86 and a pull 88. As shown, the opening 74 of arm 41 is in communication with a channel 90 that extends laterally from opening 74 into flange 86. The channel 90 allows stub 68(b) to slide through the flange 86 until seated in opening 74.

Figure 7:
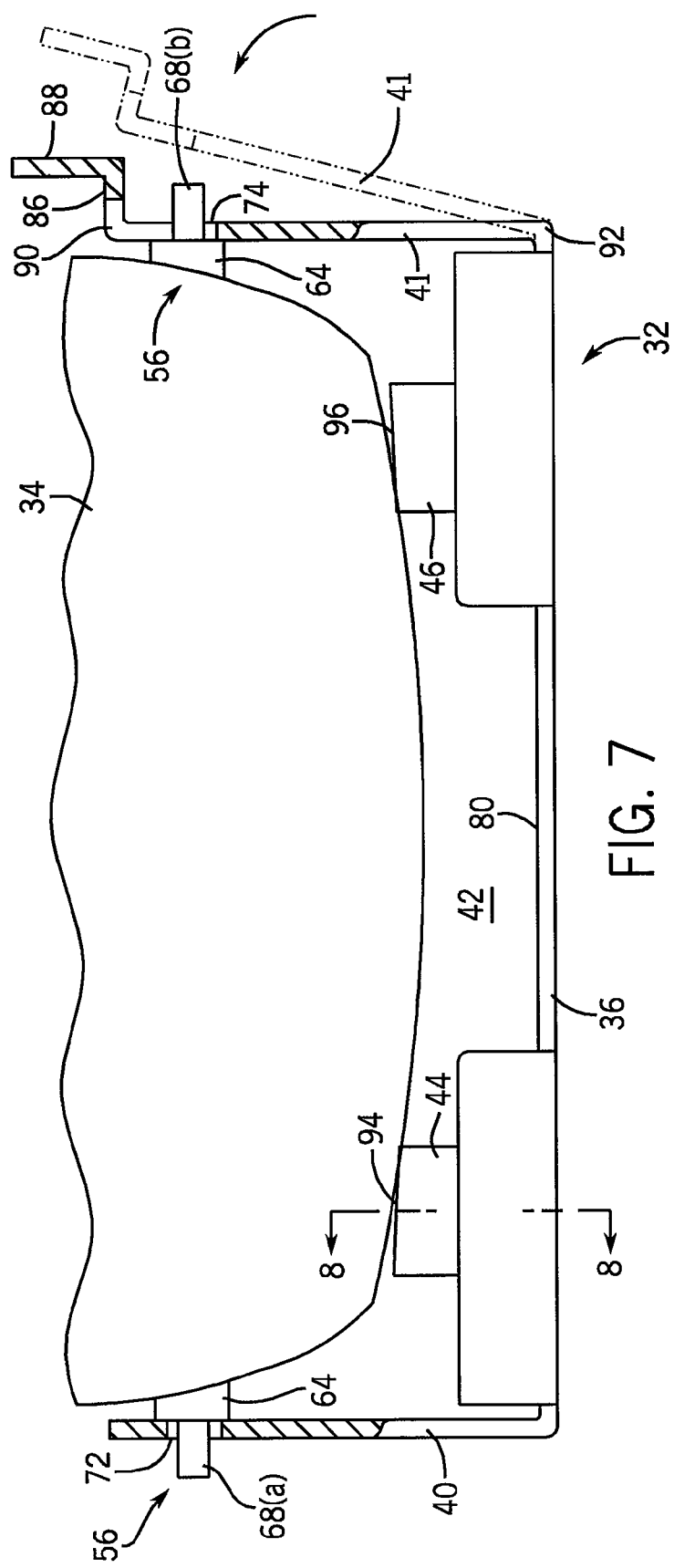
FIG. 7 is a top view similar to that of FIG. 6 showing movement of the receiver from the partially connected position of FIG. 6 to a fully connected position.

More particularly and referring now to FIGS. 6-7, when coupling the receiver 32 to the generator 12, arm 40 is positioned relative to stub 68(a) such that stub 68(a) extends through opening 72. This results in arm 40 being connected to the generator 12, but arm 41 remains disconnected, as shown in FIG. 6. To connect arm 41, a user may pull arm 41 into position using pull 88. Arm 41 is connected to connector plate 36 at a hinge point 92 that allows the arm 41 to be flexed relative to the connector plate 36. In this regard, the arm is normally biased so that a ninety-degree angle is formed between the arm 41 and connector plate 36. The hinge point 92 allows that angle to be increased as the arm 41 is pulled by a user using pull 88. The channel 90 allows the user some freedom in positioning the arm 41 relative to stub 68(b). As noted above, channel 90 is sized such that stub 68(b) may slide within channel 90. Thus, the channel 90 may be aligned with stub 68(b) and pulled against the generator 12 such that the stub 68(b) extends through the channel 90. As the user continues to pull or otherwise force the receiver 32 against the generator 12, the stub 68(b) will ride within channel 90 until being seated in opening 74. In a representative embodiment, the thickness of cushions 44, 46 is such that the respective leading edge 94, 96 of each cushion 44, 46 abuts faceplate 28 when the receiver 32 is secured to the generator 12. Thus, vibrations during operation of the generator are muted by the cushions 44, 46 and not transferred to the receiver 32. Moreover, in another representative embodiment, the body 64 of each pin 56, 58 is also composed of vibration absorbing or dampening material.

When receiver 32 is mounted to generator 12 as shown and described, stubs 68(a) and 68(b) cooperate to form a pivot axis about which receiver 32 is able to pivot relative to generator 12. As shown in FIGS. 8 and 9, during operation of generator 12, the receiver 32 is normally positioned such that cushions 44, 46 and stops 76, 78 abut against the face of the generator 12. Receiver 32 is allowed to pivot about the pivot axis defined by stubs 68(a) and 68(b), as shown in FIG. 9, such that the stops 76, 78 no longer rest against the face of the generator 12. The cushions 44, 46 are preferably comprised of vibration absorbing or dampening, viscoelastic material so they will deform as the receiver 32 is pivoted in this manner, to reduce the transfer of vibrations from operation of generator 12 to receiver 32. Thus, as the receiver 32 is pivoted upward, the cushions 44, 46 will compress against the generator 12 as shown in FIG. 9. When the pivoting force is removed, the resiliency of the cushions 44, 46 allows the cushions 44, 46 to regain their original shape such as shown in FIG. 8. In this manner, cushions 44, 46 function to bias receiver 32 toward a generally vertical position, while providing a vibration-cushioning effect when receiver 32 is pivoted upon operation of generator 12.

Figure 7A:
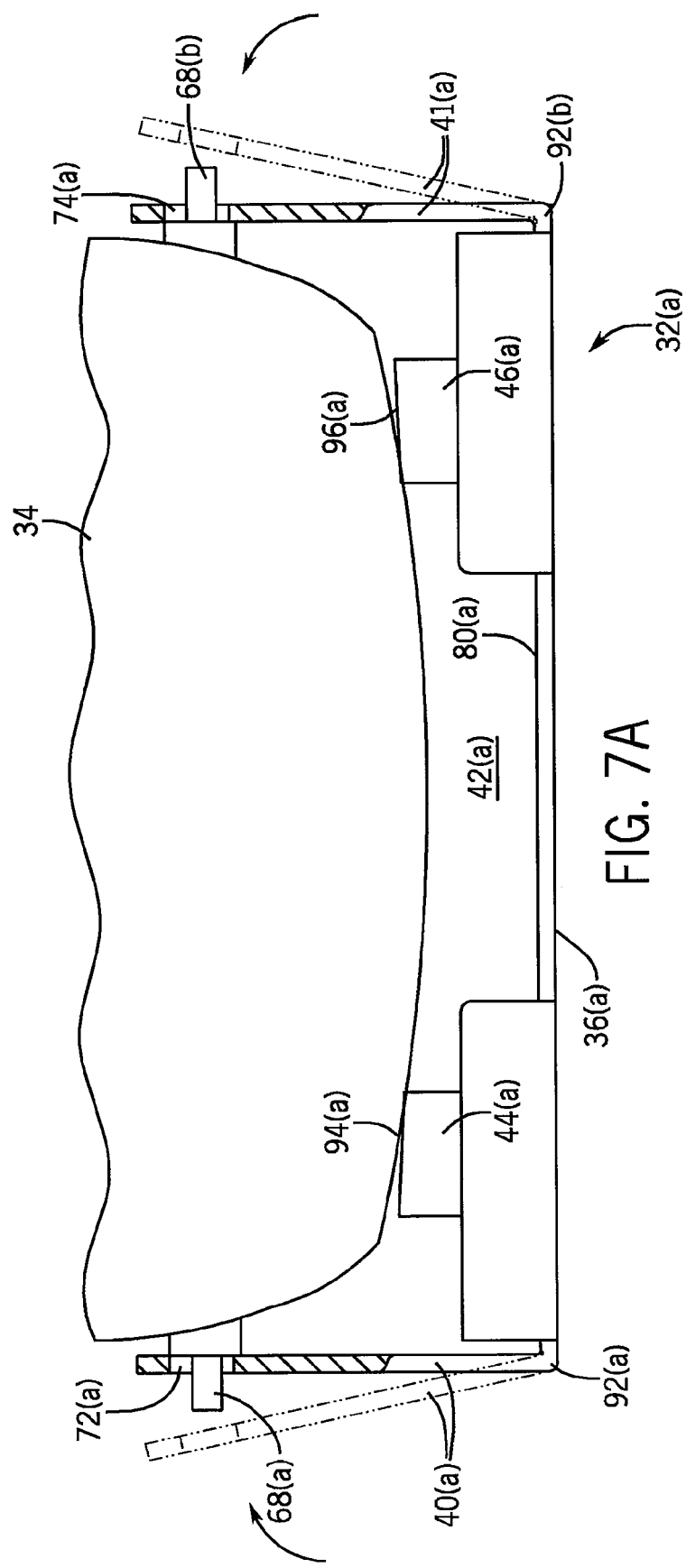
FIG. 7A is a top view of a receiver according to an alternate embodiment of the present invention connected to the electric generator.

In an alternate embodiment shown in FIG. 7A, both arms 40(a), 41(a) have openings 72(a), 72(b), respectively, and are designed to be flexed outward relative to the connector plate 36(a). In this regard, each arm 40(a), 41(b) is connected to the connector plate 36(a) at a flex or hinge point 92(a), 92(b), respectively. When coupling the receiver 32(a) to the electric generator 12, arms 40(a), 41(a) are flexed outwardly and the openings 72(a), 72(b) are aligned with stubs 68(a), 68(b), respectively. When properly aligned, the bias on the arms 40(a), 41(a) can then be removed such that the arms 40(a), 41(a) release toward the sidewalls of the electric generator 12 thereby securing the receiver 32(a) to the electric generator 12.

Figure 5:
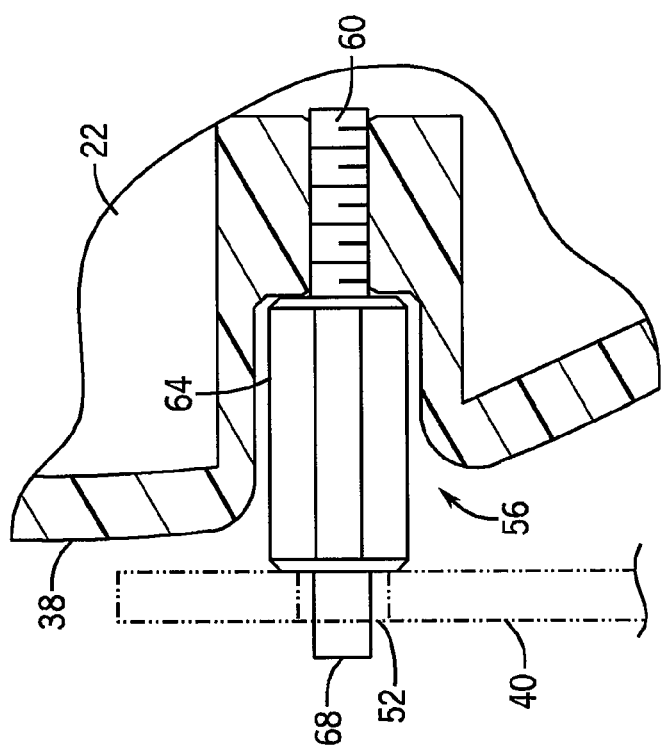
FIG. 5 is a section view of the electric generator taken along line 5-5 of FIG. 2.
Figure 11:
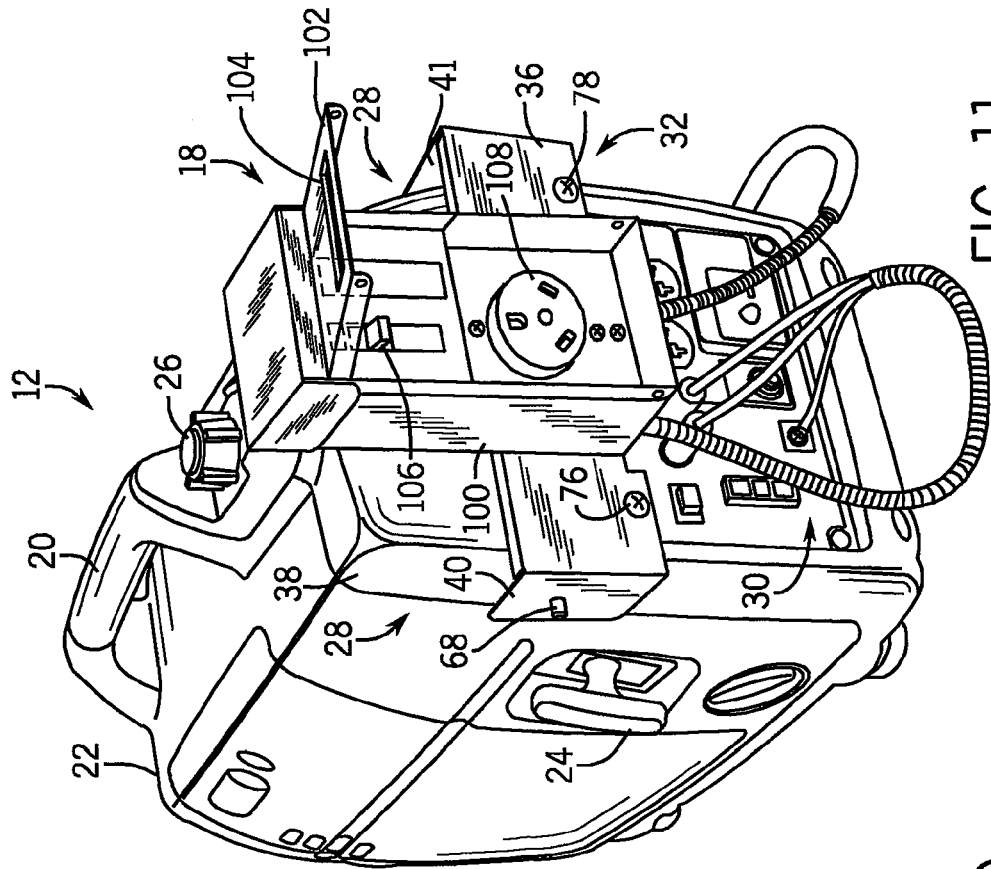
FIG. 11 is an isometric view of the electric generator and the transfer switch similar to FIG. 10 showing the access cover of the transfer switch in an open position.
Figure 10:
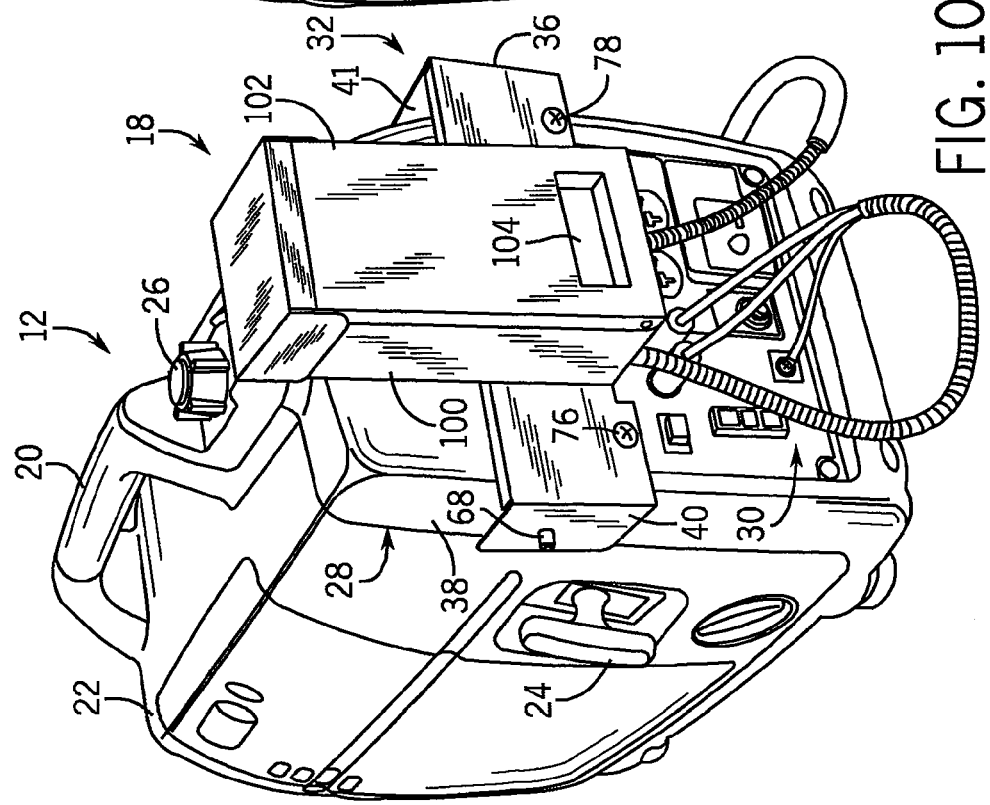
FIG. 10 is an isometric view of the electric generator of FIGS. 1 and 2 shown with a transfer switch mounted thereto according to an aspect of the present invention.

As described herein, receiver 32 is adapted to receive various electrical accessories. Referring now to FIGS. 10 and 11, one of the accessories contemplated for mounting to generator 12 is a transfer switch 18. Transfer switch 18 includes a switch box 100 having a cover plate 102 that may be lifted using handle 104. Cover plate 102 is designed to prevent access to switch 106 and outlet 108, both of which are shown in FIG. 11, when the transfer switch 18 is not in use. As is known in the art, transfer switches are designed to transfer a load from a main or utility power source to an auxiliary power source during main power interruption. Transfer switch 18 provides a similar function when connected to suitable terminals of the generator 12, as shown in FIG. 5, and connected to a load via outlet 108.

Transfer switch 18 is adapted to be mounted to receiver 32. If desired, the transfer switch 18 may be maintained in the mounted position, such as shown in FIG. 10, even when not in use, i.e., with cover plate 102 closed, or when in the operative position, shown in FIG. 11, i.e., with cover plate 102 open. The transfer switch 18 may be mounted to receiver 32 without requiring any fasteners or tools. This allows a user to quickly attach and detach the transfer switch 18 to and from the generator 12. Although the portability characteristics, e.g., size and weight, of the generator 12 are affected when the transfer switch 18 is mounted to receiver 32, the connection of the transfer switch 18 to the receiver 32 allows the transfer switch 18 to be transported with the generator 12 as a single unit.

Figure 12:
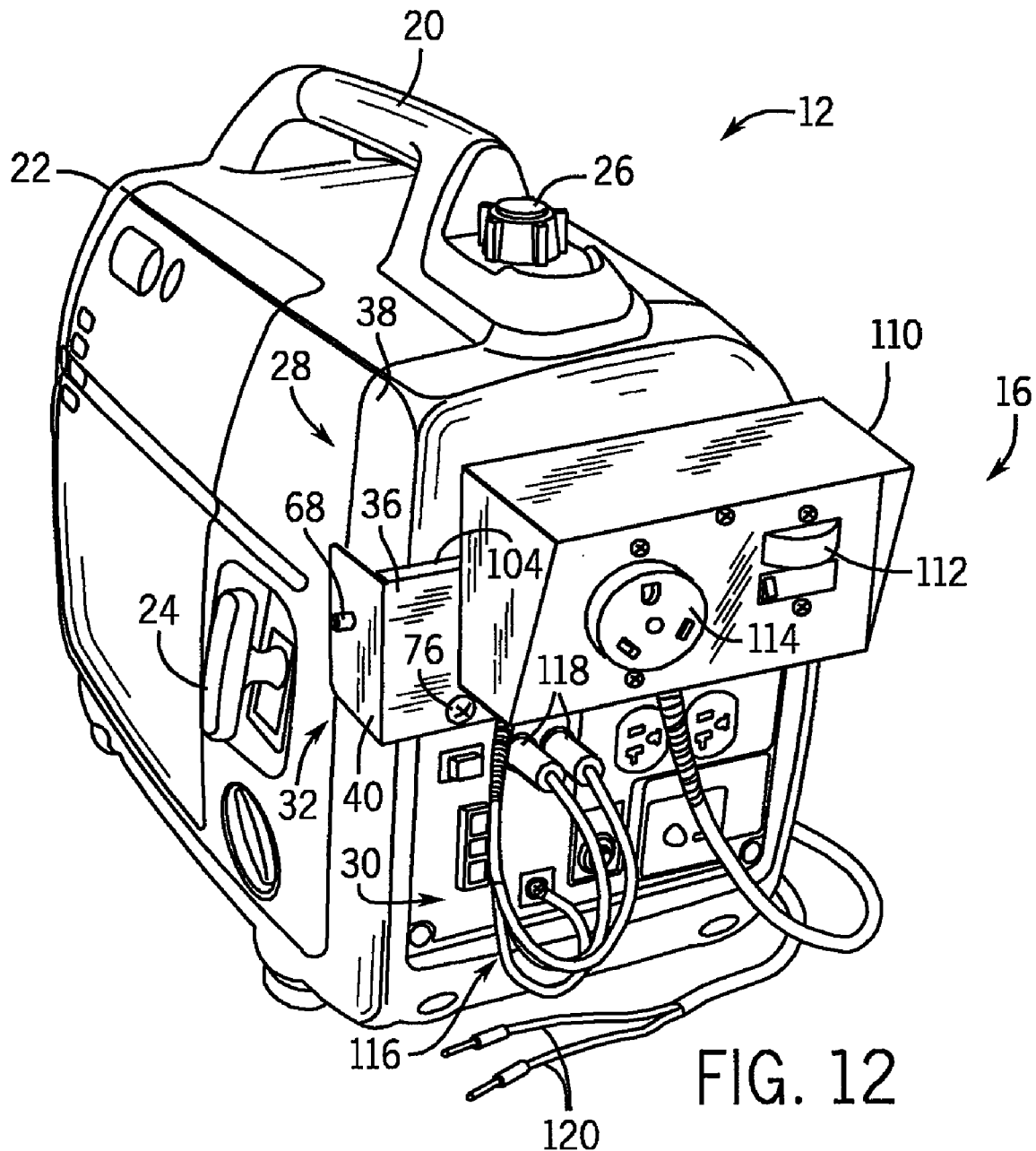
FIG. 12 is an isometric view of the electric generator of FIGS. 1 and 2 with a parallel connection device mounted thereto according to an aspect of the present invention.

Referring now to FIG. 12, a parallel connection device 16 is shown mounted to generator 12. The parallel connection device 16, as is known in the art, includes a control box 110 that includes a power meter 112 and a power outlet 114. The parallel connection device 16 includes a first pair of leads 116 that interconnect with corresponding sockets 118 of the generator 12 and a second pair of leads 120 that interconnect with corresponding sockets (not shown) of another generator (not shown) to be connected with generator 12 in parallel. The parallel connection device 16 may then combine the power outputs of the paired generators to provided a current output approximately doubled that of a single generator but with the voltage output of a single generator. Thus, for larger loads having a current draw greater than that which can be provided by generator 12 alone, a second generator (not shown) may be connected in parallel therewith to meet the power requirements for the load.

Figure 13:
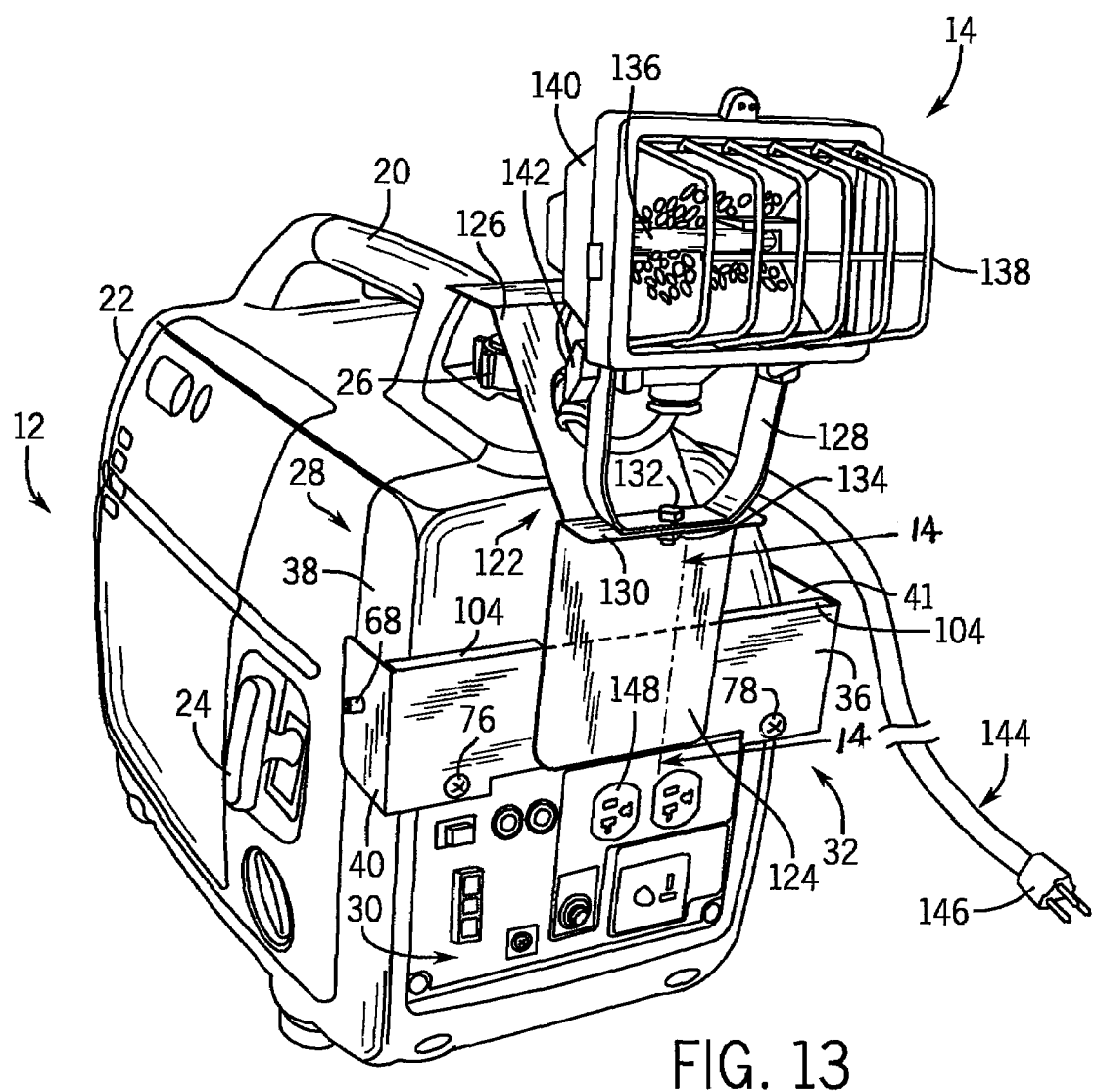
FIG. 13 is an isometric view of the electric generator of FIGS. 1 and 2 with a work light mounted thereto according to an aspect of the present invention.

The parallel connection device 16 is mounted to the same receiver 32 to which transfer switch 18 may be mounted, as shown in FIGS. 10-11, or to which work light 14 may be mounted. As shown in FIG. 13, work light 14 is bolted to and thus carried by a support assembly 122 that includes a vertical support plate 124 and an angled support plate 126 integrally formed with vertical support plate 124. The work light 14 has a U-shaped bar 128 that is bolted to a lip 130 of the vertical support plate 124 using a conventional bolt 132 and locking nut 134. The work light 14 includes a filament 136 and associated circuitry, as is known in the art, encased by a cage 138 coupled to housing 140. The U-shaped bar 128 is coupled to and extends from housing 140. In one embodiment, the housing 140 may be pivoted relative to U-shaped bar 128 at handle joint 142 to change the angle at which light is emitted. The work light 14 further includes a power cord 144 having a plug 146 that may be inserted into a suitable socket, such as socket 148, of the generator 12 so that illuminating power is delivered to the work light.

Figure 14:
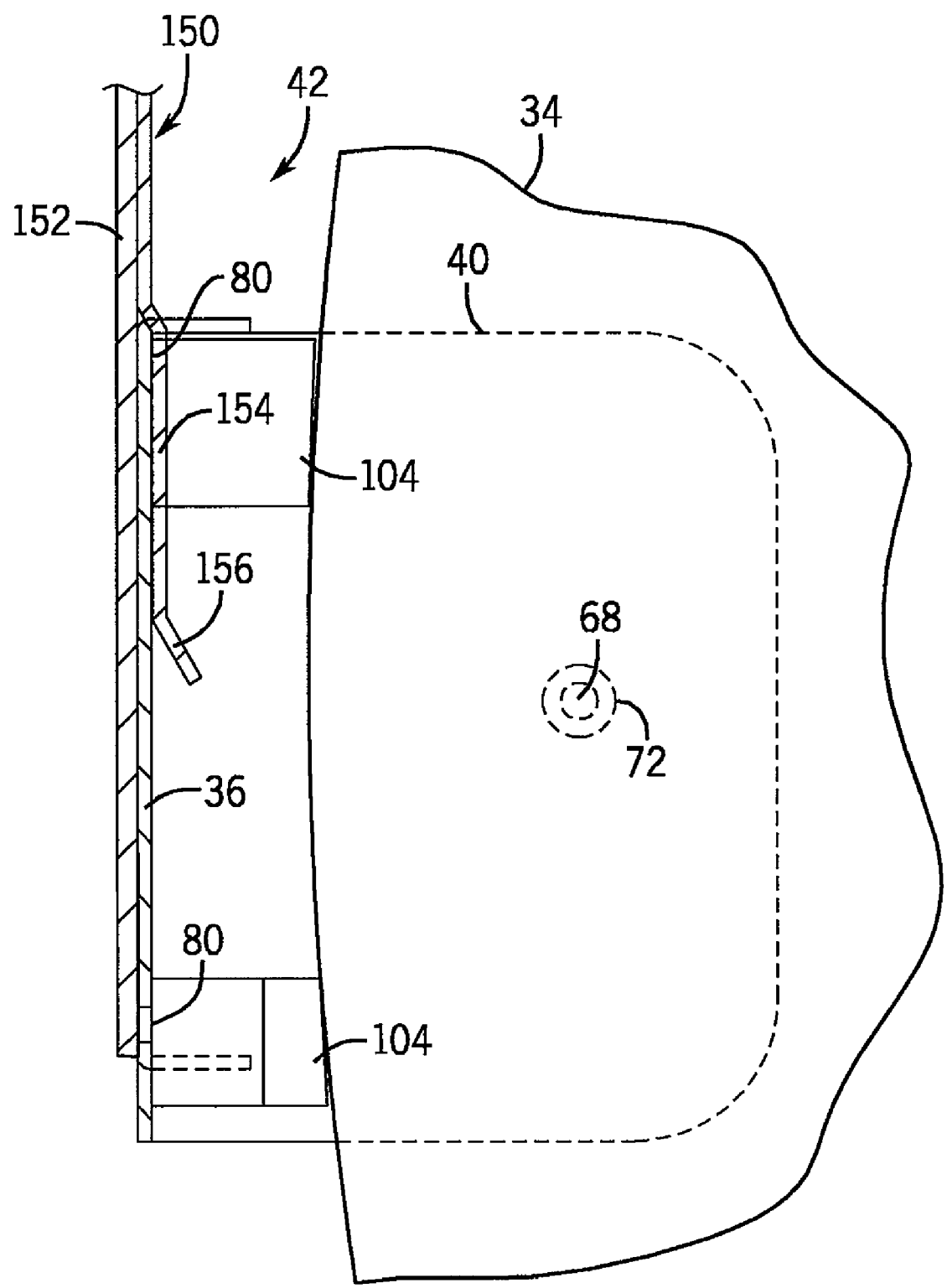
FIG. 14 is a partial section view along line 14-14 of FIG. 13 illustrating the tool-less connection of an electrical accessory to the receiver.

The generator 12 is constructed to support each of the accessories discussed above, e.g., work light 14, parallel connection device 16, and transfer switch 18, when properly mounted to receiver 32. As shown in FIG. 14, each accessory may include a clip 150 mounted to or otherwise integrally formed with the backside 152 of the electrical accessory 14, 16, or 18. The clip 150 has a downward extending arm 154 that terminates in a tongue 156 that is angled slightly outwardly from the arm 154. The clip 150 is designed such that the arm 154 naturally rests against backside 152. Thus, when the clip 150 is inserted over receiver 32, the arm 154 will be slightly displaced outwardly such that connector plate 36 is received between the arm 154 and the backside 152 of the accessory. The bias of the arm 154, however, is such that clip 150 is locked into place over receiver 32. Tongue 156 provides an interface to ease deflection of arm 154 by the connector plate 36 when the clip 150 is being inserted over the connector plate 36.

Figure 15:
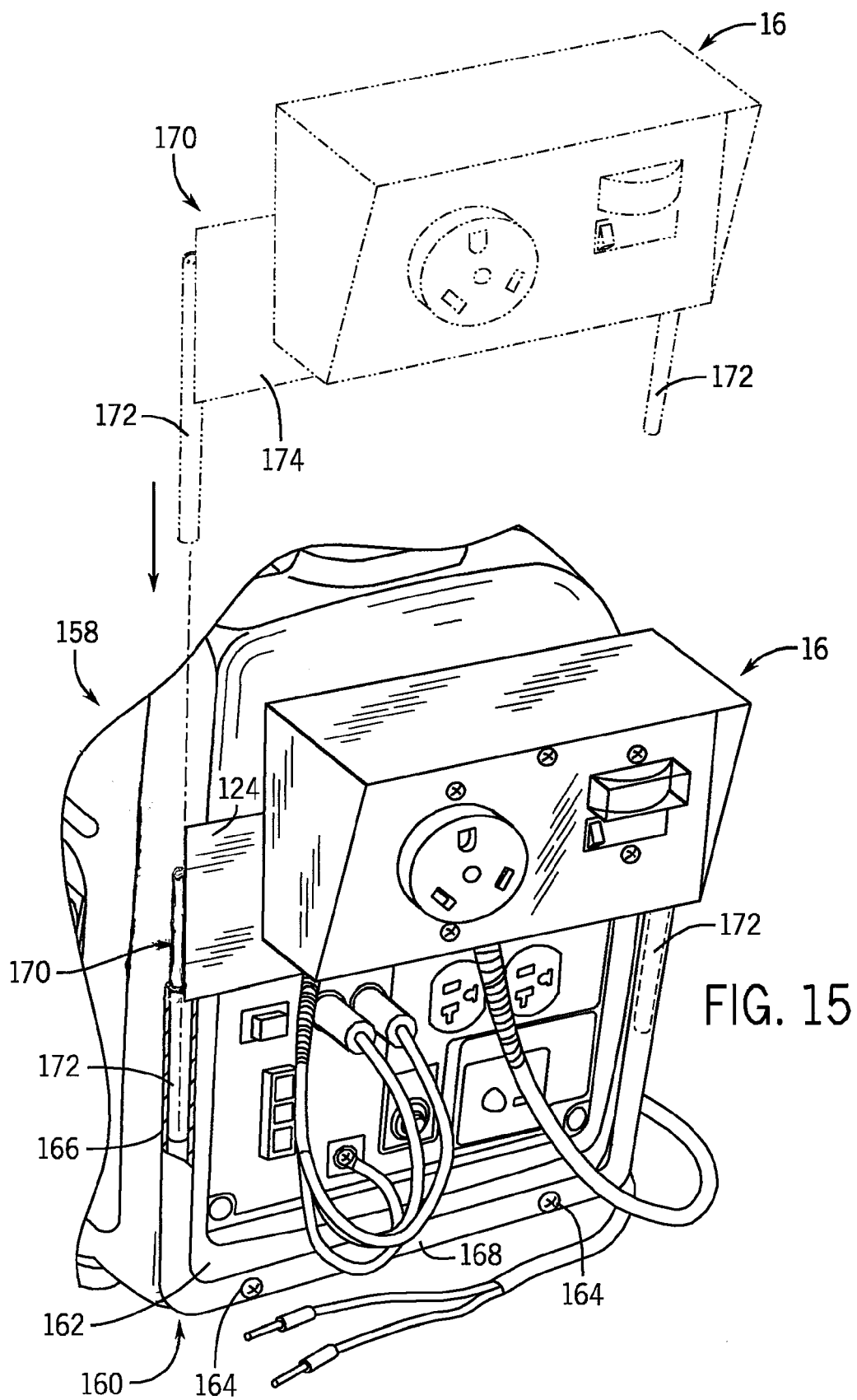
FIG. 15 is a partial isometric view of an electric generator with a parallel connection device mounted thereon using an alternate mounting structure according to another aspect of the present invention.

FIG. 15 shows another type of structure contemplated for mounting an electrical accessory to a generator, shown at 158. In this embodiment, a U-shaped frame 160 is fastened to the faceplate 162 of the generator 158 using suitable fasteners 164. The frame 160 is comprised of a pair of upwardly extending posts 166 connected by a transverse support member 168. In the illustrated embodiment, the electrical accessory shown mounted to generator 158 is parallel connection device 16, although any other accessory may be employed. The accessory is affixed to a mounting receiver 170 in any satisfactory manner, e.g. by welding or fasteners, or may be removably mounted as described above, e.g., by means of a clip such as 150. The mounting receiver 170 consists of a pair of legs 172 coupled to one another by a connector plate 174. The legs 172 are spaced from one another by a distance equal to the distance by which the pair of support posts 166 are spaced from one another. Thus, to mount the electrical accessory to the generator 158, the mounting receiver 170 is moved downwardly such that legs 172 are inserted into posts 166. When the legs 172 are seated in posts 176, the electrical accessory is securely mounted to the generator 158 but in a manner that does not require any tools or fasteners. Similarly, the electrical accessory may be de-mounted from the generator 158 by withdrawing the legs 172 from posts 166. In an alternate of this embodiment, the U-shaped frame may have legs that are inserted into posts carried by the mounting receiver.

Figure 16:
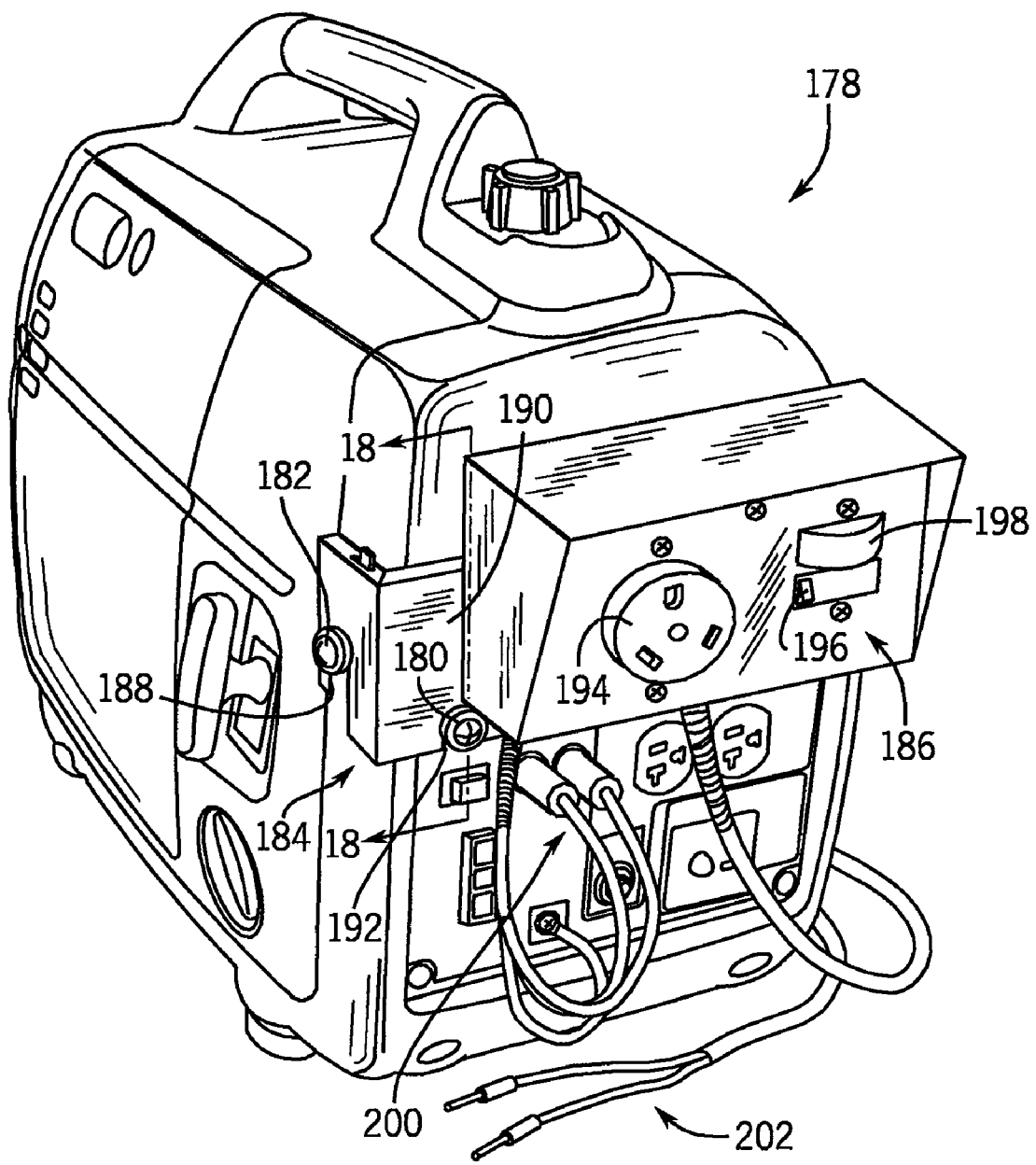
FIG. 16 is an isometric view of an electric generator and an accessory, in the form of a parallel connection device, mounted to the electric generator according to an alternate embodiment of the present invention.
Figure 17:
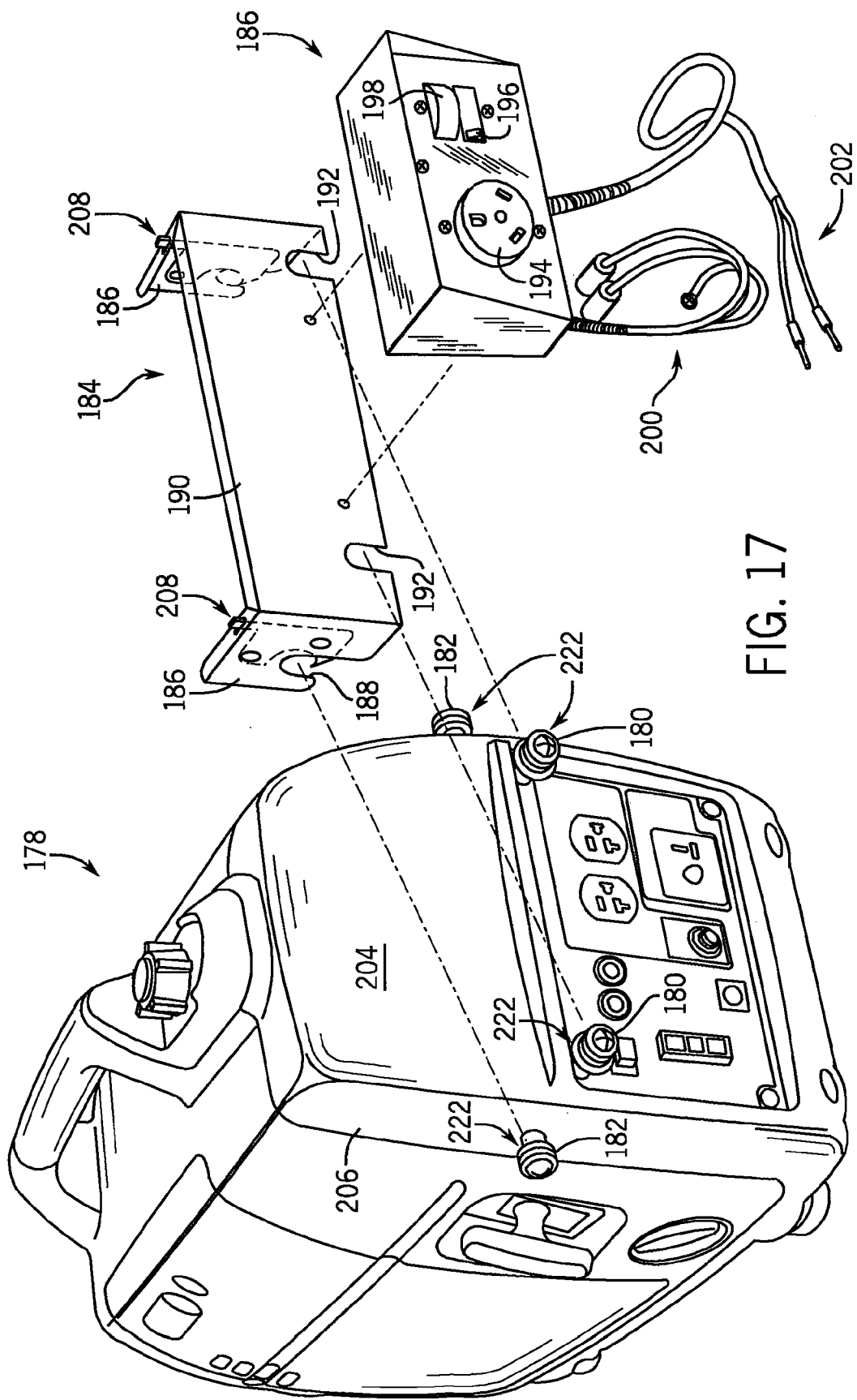
FIG. 17 is an isometric view of the electric generator of FIG. 16 with the parallel connection device and the receiver used to mount the parallel connection device to the electric generator shown detached from the electric generator.

In another embodiment, shown in FIGS. 16-17, the generator, shown at 178, is adapted to removably receive a mounting receiver that supports an accessory, such as a parallel connection device. In this embodiment, generator 178 has a pair of face posts 180 and a pair of side posts 182 with which a mounting receiver 184 is engaged to mount parallel connection device 186 to the generator 178. The mounting receiver 184 includes a pair of sidewalls 186, each of which has an open-ended notch 188 formed therein. The mounting receiver 184 further includes a connector plate 190 that also has open-ended notches 192 formed therein. The notches 188, 192 are designed to fit over posts 182, 180, respectively, when the mounting receiver 184 is mounted to the front of the generator 178, as shown in FIG. 16. The parallel connection device 186 is coupled to the mounting receiver 184 in a conventional manner, such as with screws or similar fasteners (not shown).

In the illustrated embodiment, the parallel connection device 186 has a three-prong outlet 194, an ON/OFF switch 196, and a power meter 198. As above, the parallel connection device 186 includes a first set of connectors 200 that connect to electric generator 178 and a second set of connectors 202 that connect to another electric generator (not shown).

Figure 18:
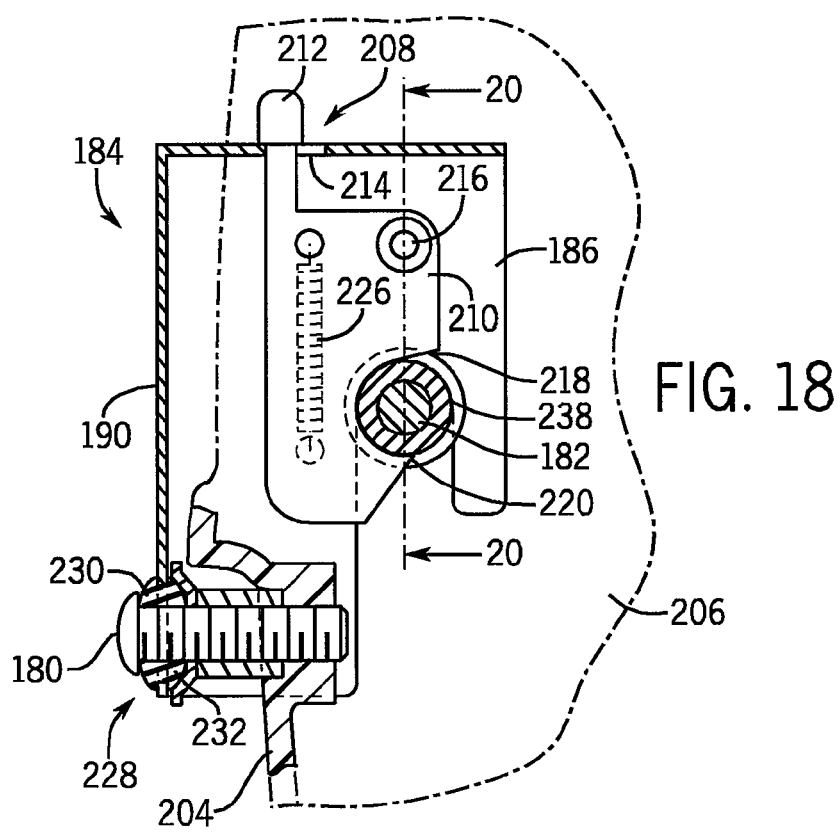
FIG. 18 is a section view of the electric generator and accessory receiver of FIG. 16 taken along line 18-18 of FIG. 16 with a latch used to couple the accessory receiver to the electric generator in a closed position.

Referring again to FIG. 17 and with further reference to FIGS. 18-19, the front of the electric generator 178 has a faceplate 204 that connects a pair of sidewalls 206 (only one of which is shown in the figures). The faceplate 204 may include various connectors, sockets, buttons, etc. as known in the art. Posts 180 extend from faceplate 204 whereas posts 182 extend from sidewalls 206.

The mounting receiver 184 has a pair of latches 208 that are used to secure the mounting receiver 184 to posts 182. Each latch 208 has a coupling member 210 having an integrated lever 212 that extends through opening 214 of sidewall 186. The coupling member 210 is coupled to sidewall 186 by a pivot pin 216 which allows the coupling member 210 to be pivoted, by lever 212, between a closed position, such as illustrated in FIG. 18, and an open position, such as illustrated in FIG. 19. The coupling member 210 includes a generally radial notch 218 that is designed to receive post 182 when the mounting receiver 184 is mounted to the electric generator 178. In one embodiment, notch 218 terminates in a pointed end 220 such that the mounting receiver 184 cannot be disconnected from post 182 unless the latch 208 is moved to the open position. To move a latch 208 from the closed position, shown in FIG. 18, to the open position, shown in FIG. 19, the coupling member 210 can be moved from the closed position to the open position, e.g., in the direction indicated by arrow 222 by moving lever 212 in the opposite direction generally indicated by arrow 224. Each latch 208 further includes a spring 226 that is coupled to a respective sidewall 186. Each spring 226 is biased to resist movement of the coupling member 210 from the closed position to the open position. Specifically, when the latch 208 is moved from the closed position to the open position, the spring 226 will stretch as the coupling member 210 is pivoted. Since the spring 226 is biased in the closed position, when the coupling member 210 is fitted against post 182 such that post 182 fits within notch 218, the spring 226 will keep the coupling member 210 snug partially around post 182.

When the mounting receiver 184 is in place, such as shown in FIG. 16 and FIG. 18, connector plate 190 rests on posts 180. Each post 180 has an isolation bushing 228 that is defined by a pair of flanges 230, 232. Referring briefly to FIG. 21, a radial channel 234 is defined between the pair of flanges 230, 232. The connector plate 190 is designed to be slidably positioned between the flanges 230, 232 along radial channel 234. The isolation bushing 228 is formed of a vibration-reducing material, such as rubber, and is designed to reduce the transfer of vibratory forces from the electric generator 178 to the mounting receiver 184, and thus the accessory, when the electric generator 178 is running.

Figure 20:
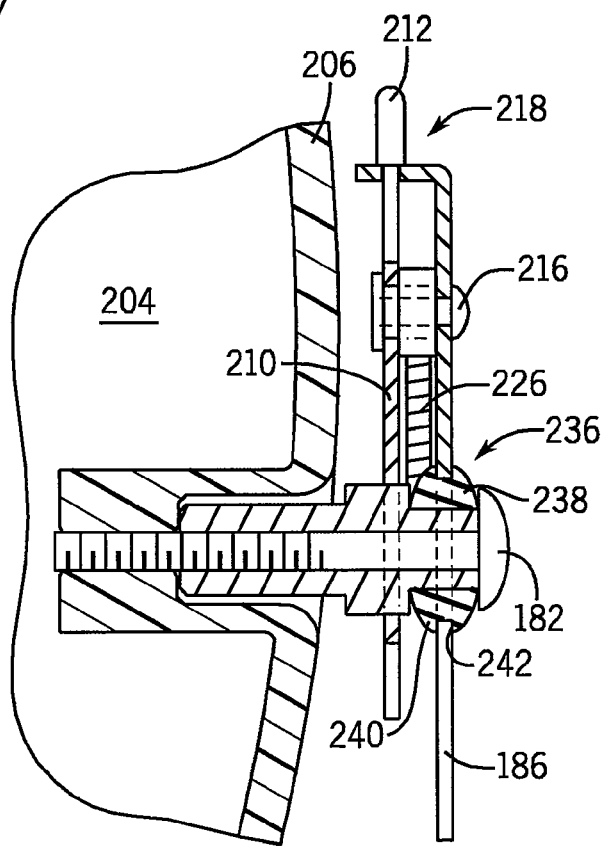
FIG. 20 is a section view of the electric generator and accessory receiver of FIG. 18 taken along line 20-20 of FIG. 18.

Similarly, posts 182 extending from sidewalls 206 also have an isolation bushing 236 defined by a pair of flanges 238, 240 separated by a radial channel 242, as shown in FIG. 20. When the mounting receiver 184 is mounted on the electric generator 178, each sidewall 186 will fit within the radial channel 242 of a respective isolation bushing 236. Thus, the transfer of vibratory forces from the electric generator 178 to the sidewalls 186 of the mounting receiver 184 is also mitigated.

Referring again to FIG. 21, when the mounting receiver 184 is mounted to the electric generator 178 in a vibration-reducing manner, the user must position the mounting receiver 184 such that sidewalls 186 fit within channel 242 and such that connector plate 190 fits within channels 234. As referenced above, each latch 208 has a lever 212 that can be used to move the coupling member 210 between closed and open positions. However, when the mounting receiver 184 is being mounted to the electric generator 178, each latch 208 is moved forward to position the coupling member 210 in the open position, shown in phantom in FIG. 21, by engagement of an angled surface of the coupling member with the post 182. When the coupling member 208 of each latch 208 is positioned over posts 182, sidewalls 186 are fitted in channels 242, and front connector plate 190 is fitted in channels 234, the bias of each spring 226 will cause the coupling member 210 to fit snuggly around posts 182.

The present invention has been described with respect to a generator having a receiver adapted to receive an electrical accessory in a manner that allows the electrical accessory to be quickly removed when desired by a user. The receiver allows an electrical accessory, such as a parallel connection kit, transfer switch, or work light, to be securely mounted to the generator, but removed when desired without the need for any tools. It is contemplated that each electrical accessory to be used with the electric generator may be permanently coupled to or otherwise formed with a receiver that is to be mounted to the electric generator. Thus, the vibration-reducing features described herein may be used with electrical accessories having integrated receivers.

The present invention has been described in terms of the preferred embodiment, and it is recognized that equivalents, alternatives, and modifications, aside from those expressly stated, are possible and within the scope of the appending claims.

What is claimed is:

1. An electric generator comprising:
   a housing enclosing an engine; and
   an accessory mounting member coupled to the housing and adapted to mount an electrical accessory to the housing, wherein a vibration-reducing cushion arrangement is interposed between the housing and the accessory mounting member to reduce the transfer of vibratory forces from the housing to the accessory mounting member during operation of the engine.

2. The electric generator of claim 1 wherein the vibration-reducing cushion arrangement includes a cushion of vibration-dampening material interconnected with the accessory mounting member.

3. The electric generator of claim 2 wherein the accessory mounting member includes a transverse member secured to the housing such that a lateral space is formed between the transverse member and the housing, and wherein the cushion occupies a portion of the lateral space.

4. The electric generator of claim 3 wherein the cushion includes a plurality of stops of cushion material affixed to a backside of the transverse member in a spaced arrangement.

5. The electric generator of claim 1 wherein the accessory mounting member is configured to allow removable engagement of the electrical accessory to and from the housing.

6. The electric generator of claim 5 wherein the accessory mounting member and the accessory include a removable engagement arrangement that is configured to removably mount the electrical accessory to the accessory mounting member in a tool-less manner.

7. The electric generator of claim 1 wherein the housing has a pair of outwardly extending pins, and wherein the accessory mounting member includes a pair of holes that receive the pins to secure the accessory mounting member to the housing.

8. The electric generator of claim 7 wherein the accessory mounting member is removably coupled to the housing via the pair of pins.

9. The electric generator of claim 8 wherein housing includes a first sidewall from which a first pin extends and a second sidewall from which a second pin extends and wherein the accessory mounting member includes a first end having a first opening that receives the first pin and a second end having a second opening that receives the second pin and a transverse member connected between the first end and the second end.

10. The electric generator of claim 7 wherein the accessory mounting member and the pair of pins are configured to allow pivoting movement of the accessory mounting member relative to the housing about a pivot axis defined by the pair of pins.

11. The electric generator of claim 1 further comprising a plurality of posts spaced from one another and interconnected with the housing and wherein the accessory mounting member is adapted to slidably engage the plurality of posts to secure the accessory mounting member to the housing.

12. The electric generator of claim 11 wherein each post includes an elongated member extending from the housing and wherein the cushion arrangement includes a plurality of isolation bushings associated with the plurality of posts.

13. The electric generator of claim 12 wherein the accessory mounting member includes a latch assembly configured to engage two of the plurality of posts to releasably engage the receiver with the two of the plurality of posts.

14. The electric generator of claim 13 wherein the latch assembly includes first and second latches, each latch comprising a pivoting member coupled to a lever that is adapted to move the pivoting member between an open and a closed position.

15. A kit comprising:
   a portable generator; and
   an accessory mounting member configured for engagement with the portable generator, wherein the accessory mounting member carries at least one cushion formed of vibration-dampening material that is configured to engage an external surface defined by the generator, wherein the accessory mounting member is configured to mount an electrical accessory to the generator.

16. The kit of claim 15 wherein the accessory mounting member and the electrical accessory include a removable engagement arrangement that enables the accessory to be removably engaged with the accessory mounting member.

17. The kit of claim 15 wherein the accessory mounting member is U-shaped and includes a pair of posts adapted to receive a pair of mounting extensions coupled to the electrical accessory.

18. An accessory mounting member connectable to an electric generator and adapted to carry an electrical accessory to be powered by the electric generator, the accessory mounting member comprising:
   a first end and a second end, each end adapted to engage a housing of the electric generator;
   a transverse member connected between the first end and the second end and adapted to be spaced from the electric generator housing when the first end and the second end are engaged with the electric generator housing; and a vibration-dampening cushion carried by the transverse member.

19. The accessory mounting member of claim 18 wherein the vibration-dampening cushion is secured to a stop member that extends from a rear surface defined by the transverse member that faces the electric generator housing.

20. The receiver of claim 18 wherein the vibration-dampening cushion is mounted directly to a rear surface defined by the transverse member.

21. The receiver of claim 18 wherein the first end and the second end of the accessory mounting member are adapted to pivot relative to the electric generator when engaged with the electric generator housing.

* * * * *

UNITED STATES PATENT AND TRADEMARK OFFICE
CERTIFICATE OF CORRECTION

| | | |
|---|---|---|
| PATENT NO. | : 7,735,801 B1 | Page 1 of 1 |
| APPLICATION NO. | : 12/046085 | |
| DATED | : June 15, 2010 | |
| INVENTOR(S) | : David D. Flegel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 122 days.

Signed and Sealed this
Tenth Day of July, 2012

David J. Kappos
*Director of the United States Patent and Trademark Office*